US012608108B2

(12) United States Patent
Kim et al.

(10) Patent No.: US 12,608,108 B2
(45) Date of Patent: Apr. 21, 2026

(54) DISPLAY SYSTEM HAVING TOUCH DRIVER CONFIGURED TO TRANSMIT UPLINK SIGNALS, AND METHOD OF DRIVING DISPLAY DEVICE

(71) Applicant: Samsung Display Co., LTD., Yongin-si (KR)

(72) Inventors: Ji Hoon Kim, Yongin-si (KR); Keum Dong Jung, Yongin-si (KR); Jang Hui Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/592,254

(22) Filed: Feb. 29, 2024

(65) Prior Publication Data

US 2025/0021195 A1     Jan. 16, 2025

(30) Foreign Application Priority Data

Jul. 13, 2023    (KR) ........................ 10-2023-0091359

(51) Int. Cl.
*G09G 3/20* (2006.01)
*G06F 3/044* (2006.01)

(52) U.S. Cl.
CPC ............. *G06F 3/0441* (2019.05); *G09G 3/20* (2013.01); *G09G 2310/061* (2013.01)

(58) Field of Classification Search
CPC ... G06F 3/0441; G09G 3/20; G09G 2310/061
See application file for complete search history.

(56) References Cited

U.S. PATENT DOCUMENTS

| | | | |
|---|---|---|---|
| 7,864,160 | B2 | 1/2011 | Geaghan et al. |
| RE42,738 | E | 9/2011 | Williams |
| 9,616,982 | B2 | 4/2017 | Hollis et al. |
| | | (Continued) | |

FOREIGN PATENT DOCUMENTS

| | | | |
|---|---|---|---|
| KR | 10-2013-0056445 A | 5/2013 | |
| KR | 10-1519225 B1 | 5/2015 | |
| | | (Continued) | |

OTHER PUBLICATIONS

US Office Action dated Jul. 18, 2024, issued in U.S. Appl. No. 18/508,163 (14 pages).

(Continued)

*Primary Examiner* — Afroza Chowdhury
(74) *Attorney, Agent, or Firm* — Womble Bond Dickinson (US) LLP

(57) ABSTRACT

A display device, includes: a display panel including pixels; a display driver configured to operate in a unit of a frame period including an active period and a blank period and to display an image on the display panel in the active period of the frame period, based on image data; a touch array on the display panel and including touch electrodes; a touch driver configured to transmit, in an uplink period, uplink signals including different information to an external device in proximity to the touch array through the touch electrodes, and to receive, from the external device, a sensing signal generated by the external device using at least some of the uplink signals; and a touch controller configured to determine the uplink period based on the image data.

18 Claims, 13 Drawing Sheets

(56)          References Cited

U.S. PATENT DOCUMENTS

| | | |
|---|---|---|
| 10,254,891 B2 | 4/2019 | Noh |
| 10,268,285 B2 | 4/2019 | Jung et al. |
| 10,366,264 B2 | 7/2019 | Kim et al. |
| 10,838,546 B2 | 11/2020 | Choi |
| 10,936,101 B2 | 3/2021 | Lee et al. |
| 11,656,729 B2 | 5/2023 | Park et al. |
| 11,829,549 B2 | 11/2023 | Chen et al. |
| 2017/0285771 A1 | 10/2017 | Jung et al. |
| 2018/0188836 A1 | 7/2018 | Park |
| 2019/0179475 A1 | 6/2019 | Seo et al. |
| 2020/0004367 A1* | 1/2020 | Lee ....................... G06F 3/0412 |
| 2020/0201505 A1 | 6/2020 | Jung et al. |
| 2021/0019019 A1 | 1/2021 | Zhang et al. |
| 2021/0397298 A1 | 12/2021 | Choi et al. |
| 2022/0019331 A1 | 1/2022 | Park et al. |
| 2022/0043537 A1 | 2/2022 | Lee et al. |
| 2022/0171514 A1 | 6/2022 | Kim et al. |
| 2022/0334698 A1 | 10/2022 | Gur et al. |
| 2023/0236677 A1 | 7/2023 | Cheng et al. |
| 2024/0077975 A1 | 3/2024 | Lee et al. |
| 2024/0153449 A1 | 5/2024 | Zhong et al. |
| 2024/0370115 A1* | 11/2024 | Jung ..................... H04W 72/21 |
| 2024/0377909 A1* | 11/2024 | Jung ................... G06F 3/04184 |

FOREIGN PATENT DOCUMENTS

| | | |
|---|---|---|
| KR | 10-2238697 B1 | 4/2021 |
| KR | 10-2022-0018364 A | 2/2022 |
| KR | 10-2364099 B1 | 2/2022 |
| KR | 10-2409949 B1 | 6/2022 |
| KR | 10-2022-0112574 A | 8/2022 |
| KR | 10-2460552 B1 | 10/2022 |
| KR | 10-2552745 B1 | 7/2023 |

OTHER PUBLICATIONS

US Office Action dated Oct. 23, 2024, issued in U.S. Appl. No. 18/589,620 (11 pages).
US Office Action dated Mar. 6, 2026, issued in U.S. Appl. No. 18/419,386 (19 pages).

\* cited by examiner

DD

I

I'

DA

NDA

DR3

DR2

DR1

DD

WD

OCA

TS

DP

I

I'

DR3

DP

| | |
|---|---|
| THIN-FILM ENCAPSULATION LAYER | TFE |
| DISPLAY ELEMENT LAYER | DPL |
| PIXEL CIRCUIT LAYER | PCL |
| SUBSTRATE | SUB |

DISPLAY SYSTEM HAVING TOUCH DRIVER CONFIGURED TO TRANSMIT UPLINK SIGNALS, AND METHOD OF DRIVING DISPLAY DEVICE

CROSS-REFERENCE TO RELATED APPLICATION

The present application claims priority to and the benefit of Korean Patent Application No. 10-2023-0091359, filed on Jul. 13, 2023, in the Korean Intellectual Property Office, the entire disclosure of which is incorporated herein by reference.

BACKGROUND

1. Field

Aspects of some embodiments of the present disclosure relate to a display device that supports touch functionality.

2. Description of Related Art

With the growth of mobile electronic devices such as smartphones and tablet computers, display devices having touch electrodes on display panels to detect touch input have become widely used. Recently, there has been an increasing demand for display devices that can recognize touch input not only with fingers but also with other tools such as active pens.

However, there are a lot of difficulties for display devices to relatively efficiently support both touch input from fingers or the like and touch input from active pens or styluses while still providing basic display functionality. For example, with the trend toward larger and faster displays in display devices, there is a risk of degradation in sensing performance for touch recognition, which may lead to a reduction in reliability of the operation of the display devices and electronic devices.

The above information disclosed in this Background section is only for enhancement of understanding of the background and therefore the information discussed in this Background section does not necessarily constitute prior art.

SUMMARY

Aspects of some embodiments of the present disclosure relate to a display device that supports touch functionality, and for example, to a display device that uses touch electrodes to detect user touches, a display system, and a method of operating the display device.

Aspects of some embodiments of the present disclosure include a display device and display system capable of recognizing the position of an external device on a touch array with relatively improved reliability.

Aspects of some embodiments of the present disclosure include a method of driving the display device.

According to some embodiments of the present disclosure, a display device includes: a display panel including pixels, a display driver configured to operate in a unit of a frame period including an active period and a blank period and display an image on the display panel in the active period of the frame period, based on image data, a touch array on the display panel and including touch electrodes, a touch driver configured to transmit, in an uplink period, uplink signals including different information to an external device in proximity to the touch array through the touch electrodes, and receive, from the external device, a sensing signal generated by the external device using at least some of the uplink signals, and a touch controller configured to determine the uplink period based on the image data.

According to some embodiments, the uplink period may overlap the active period.

According to some embodiments, the uplink period may further overlap the blank period.

According to some embodiments, the blank period may be provided after the active period in the frame period.

According to some embodiments, the blank period may be provided before the active period in the frame period.

According to some embodiments, the touch controller may determine the uplink period with reference to grayscale levels of data pixels in the image data.

According to some embodiments, the touch controller may compare the data pixels in the image data to be displayed on adjacent pixels among the pixels. According to some embodiments, based on a result of the comparison, the uplink period may overlap a time period in which the adjacent pixels emit light within the active period.

According to some embodiments, the touch controller may compare the data pixels in the image data to be displayed on adjacent pixels among the pixels. According to some embodiments, based on a result of the comparison, the uplink period may overlap a time period other than a time period in which the adjacent pixels emit light within the active period.

According to some embodiments, a first image frame may be received as the image data for a first frame period, and a second image frame may be received as the image data for a second frame period subsequent to the first frame period. According to some embodiments, the touch controller may compare data pixels in the first image frame to be displayed on some pixels among the pixels, and data pixels in the second image frame to be displayed on the some pixels. According to some embodiments, based on a result of the comparison, the uplink period may overlap a time period other than a time period in which the some pixels emit light within the active period of the second frame period.

According to some embodiments, the touch electrodes may include first touch electrodes extending in a first direction, and second touch electrodes extending in a second direction. According to some embodiments, the touch driver may generate the uplink signals by encoding respective different information of the first touch electrodes and the second touch electrodes.

According to some embodiments of the present disclosure, a display system includes: a display device comprising a display panel including pixels, and a touch array on the display panel and including touch electrodes, the display device being configured to operate in a unit of a frame period including an active period and a blank period and display an image on the display panel in the active period of the frame period, based on image data, and an external device configured to communicate with the display device through the touch array. According to some embodiments, the display device may transmit, in an uplink period, uplink signals including different information to the external device in proximity to the touch array through the touch electrodes, receive, from the external device, a sensing signal generated by the external device using at least some of the uplink signals, and determine the uplink period based on the image data. According to some embodiments, the external device may generate the sensing signal using the uplink signals received through the touch electrodes in the uplink period.

According to some embodiments, the external device may calculate a noise component with reference to grayscale levels of data pixels in the image data.

According to some embodiments, the external device may offset the noise component from the sensing signal generated using the uplink signals.

According to some embodiments, the uplink period may overlap the active period.

According to some embodiments, the uplink period may further overlap the blank period.

According to some embodiments, the display device may determine the uplink period with reference to grayscale levels of data pixels in the image data.

According to some embodiments, the display device may compare the data pixels in the image data to be displayed on adjacent pixels among the pixels. According to some embodiments, based on a result of the comparison, the uplink period may overlap a time period in which the adjacent pixels emit light within the active period.

According to some embodiments, the display device may compare the data pixels in the image data to be displayed on adjacent pixels among the pixels. According to some embodiments, based on a result of the comparison, the uplink period may overlap a time period other than a time period in which the adjacent pixels emit light within the active period.

According to some embodiments, a first image frame may be received as the image data for a first frame period, and a second image frame may be received as the image data for a second frame period subsequent to the first frame period. According to some embodiments, the display device may compare data pixels in the first image frame to be displayed on some pixels among the pixels, and data pixels in the second image frame to be displayed on some pixels. According to some embodiments, based on a result of the comparison, the uplink period may overlap a time period other than a time period in which the some pixels emit light within the active period of the second frame period.

According to some embodiments of the present disclosure, in a method of driving a display device configured to operate in a unit of a frame period including an active period and a blank period and display an image on the display panel in the active period of the frame period, based on image data, the display device may include the display panel including pixels, and a touch array on the display panel and including touch electrodes, the method may include determining an uplink period in which uplink signals including different information are transmitted through the touch electrodes based on the image data, transmitting the uplink signals to an external device in proximity to the touch array in the uplink period, and receiving, from the external device, a sensing signal generated by the external device using at least some of the uplink signals.

BRIEF DESCRIPTION OF THE DRAWINGS

FIG. 10 is a timing diagram illustrating aspects of a method of transmitting uplink signals according to some embodiments.

DETAILED DESCRIPTION

Hereinafter, aspects of some embodiments of the present disclosure will be described in more detail with reference to the attached drawings. In the following description, only parts required for understanding of operations in accordance with the present disclosure will be described, and explanation of the other parts will be omitted not to make the gist of the present disclosure unclear. Accordingly, the present disclosure is not limited to the embodiments set forth herein but may be embodied in other types. Rather, these embodiments are provided so that the present disclosure will be thorough and complete, and will fully convey the technical spirit of the disclosure to those skilled in the art.

It will be understood that when an element is referred to as being "coupled" or "connected" to another element, it can be directly coupled or connected to the other element or indirectly coupled or connected to the other element with intervening elements therebetween. The terminology used herein is for the purpose of describing particular embodiments only and is not intended to be limiting. In the specification, when an element is referred to as "comprising" or "including" a component, it does not preclude another component but may further include other components unless the context clearly indicates otherwise. "at least one of X, Y, and Z" and "at least one selected from the group consisting of X, Y, and Z" may be construed as X only, Y only, Z only, or any combination of two or more of X, Y, and/or Z (for instance, XYZ, XYY, YZ, and ZZ). As used herein, the term "and/or" can include any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Figures 1, 2:
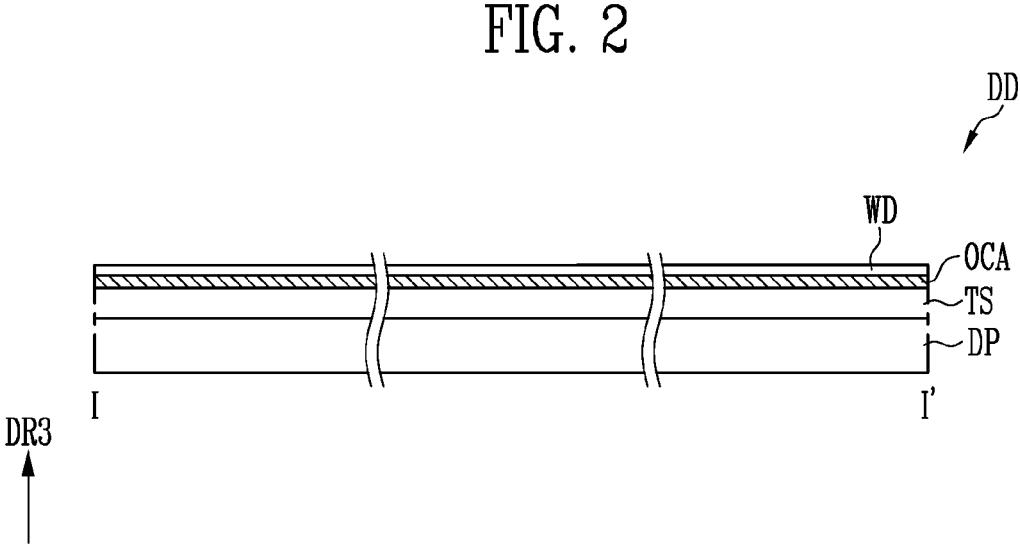
FIG. 1 is a perspective view schematically illustrating a display device according to some embodiments of the present disclosure.
FIG. 2 is a sectional view taken along the line I-I' of FIG. 1.

FIG. 1 is a perspective view schematically illustrating a display device DD according to some embodiments of the present disclosure. Referring to FIG. 1, if the display device DD is an electronic device having a display surface on one surface thereof, e.g., a smartphone, a television, a tablet PC, a mobile phone, a video phone, an electronic reader, a desktop PC, a laptop PC, a netbook computer, a workstation, a server, a PDA, a portable multimedia player (PMP), an MP3 player, a medical appliance, a camera, or a wearable device, embodiments according to the present disclosure may be applied to the display device DD.

The display device DD may be provided in various forms, for example, in the form of a rectangular plate having two pairs of parallel sides, but the present disclosure is not limited thereto. In case that the display device DD is provided in the form of a rectangular plate, any one pair of sides of the two pairs of sides may be longer than the other pair of sides. Although in the drawing each of the plurality of display devices DD has an angled corner formed by linear lines, the present disclosure is not limited thereto. According to some embodiments, in the display device DD provided in the form of a rectangular plate, a corner where one long side and one short side meet may have a round shape. Additionally, the display device DD may have a generally circular, elliptical, or polygonal shape in a plan view.

According to some embodiments of the present disclosure, for the sake of explanation, there is illustrated an example in which the display device DD has a rectangular form with a pair of long sides and a pair of short sides. The direction in which the long sides extend refers to a second direction DR2, the direction in which the short sides extend refers to a first direction DR1, and the direction perpendicular to the long sides and the short sides refers to a third direction DR3. The first to third directions DR1, DR2, and DR3 may refer to the directions indicated by the first to third directions DR1, DR2, and DR3, respectively.

According to some embodiments of the present disclosure, at least a portion of the display device DD may have flexibility, and the display device may fold at the portion having the flexibility.

The display device DD may include a display area DA provided to display images, and a non-display area NDA provided on at least one side of the display area DA. The non-display area NDA may be an area at which images are not displayed. However, embodiments according to the present disclosure are not limited thereto. According to some embodiments, the shape of the display area DD_DA and the shape of the non-display area NDA may be designed to be relative to each other.

FIG. 2 is a sectional view taken along the line I-I' of FIG. 1.

Referring to FIG. 2, the display device DD may include a display panel DP, a touch sensor TS, and a window WD.

The display panel DP may display an image through the display area DD_DA. A self-emissive display panel, such as an organic light emitting display panel (OLED panel) using an organic light emitting diode as a light emitting element, a subminiature light emitting diode (nano-scale LED) display panel using a subminiature LED as a light emitting element, and a quantum dot organic light emitting display panel (QD OLED panel) using a quantum dot and an organic light emitting diode, may be used as the display panel DP. In addition, a non-emissive display panel such as a liquid crystal display (LCD) panel, an electrophoretic display (EPD) panel, or an electrowetting display (EWD) panel may be used as the display panel DP. In case that the non-emissive display panel is used as the display panel DP, the display device DD may include a backlight unit configured to supply light to the display panel DP.

The window WD may be provided on the display panel DP and the touch sensor TS to protect an exposed surface. The window WD may protect the display panel DP and the touch sensor TS from external impact, and provide an input surface and/or a display surface to the user. The window WD may be joined with the display panel DP and the touch sensor TS by an optical transparent adhesive (or bonding) agent OCA.

The window WD may have a multilayer structure selected from among a glass substrate, a plastic film, and a plastic substrate. The multilayer structure may be formed through a successive process or an adhesion process using an adhesive layer. The window WD may entirely or partially have flexibility.

Figure 3:
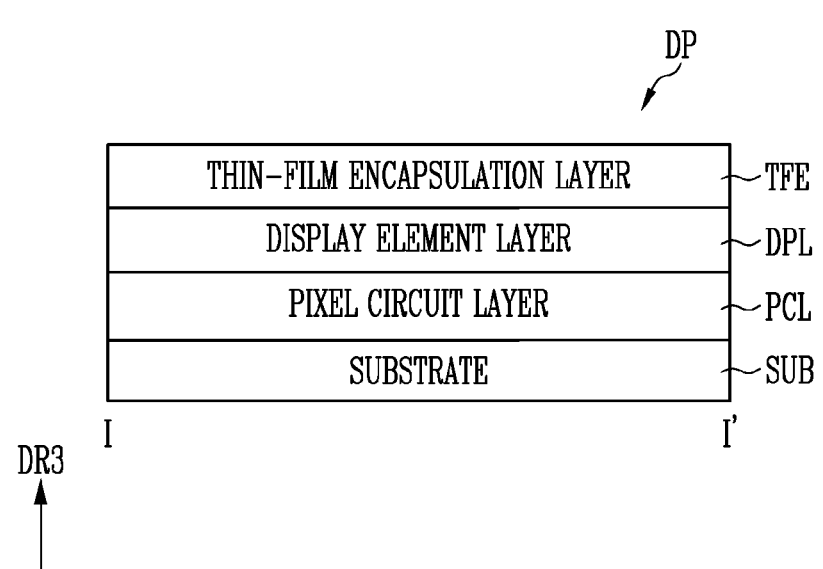
FIG. 3 is a block diagram illustrating aspects of a display panel of FIG. 2 according to some embodiments.

FIG. 3 is a block diagram illustrating further details of the display panel DP of FIG. 2 according to some embodiments.

Referring to FIGS. 3 to 6, the display panel DP may include a substrate SUB, a pixel circuit layer PCL, a display element layer DPL, and a thin-film encapsulation layer TFE.

The substrate SUB may be a rigid substrate or a flexible substrate. Here, in the case where the substrate SUB is a rigid substrate, the substrate SUB may be one of a glass substrate, a quartz substrate, a glass ceramic substrate, and a crystalline glass substrate. In the case where the flexible substrate SUB is a flexible substrate, the substrate SUB may be either a film substrate or a plastic substrate that includes polymer organic material. Furthermore, the substrate SUB may include fiber glass reinforced plastic (FRP).

The pixel circuit layer PCL may be located on the substrate SUB. The pixel circuit layer PCL may include a plurality of thin-film transistors and lines connected to the thin-film transistors. For example, each thin-film transistor may have a structure formed by successively stacking a semiconductor layer, a gate electrode, source/drain electrodes with insulating layers interposed therebetween. The semiconductor layer may include amorphous silicon, poly silicon, low temperature poly silicon, and an organic semiconductor. Although each of the gate electrode and the source/drain electrodes may include one of aluminum (Al), copper (Cu), titanium (Ti), and molybdenum (Mo), the present disclosure is not limited thereto. In addition, the pixel circuit layer PCL may include at least one or more insulating layers.

The display element layer DPL may be located on the pixel circuit layer PCL. The display element layer DPL may include a light emitting element configured to emit light. Although the light emitting element may be, for example, an organic light emitting diode, embodiments according to the present disclosure are not limited thereto. According to some embodiments, the light emitting element may be an inorganic light emitting element including inorganic light emitting material, or a light emitting element (a quantum dot display element) that uses quantum dots to emit light while changing the wavelength of light to be emitted. The organic light emitting diode may have, for example, a structure formed by successively stacking an anode electrode, a hole transport layer, an organic emission layer, an electron transport layer, and a cathode electrode, but embodiments according to the present disclosure are not limited thereto.

The thin-film encapsulation layer TFE may be located on the display element layer DPL. The thin-film encapsulation layer TFE may be an encapsulation substrate or have the form of an encapsulation layer having a multilayer structure. In the case where the thin-film encapsulation layer TFE has the form of the encapsulation layer, the thin-film encapsulation layer TFE may include an inorganic layer and/or an organic layer. For example, the thin-film encapsulation layer TFE may have a structure formed by successively stacking an inorganic layer, an organic layer, and an inorganic layer. The thin-film encapsulation layer TFE may prevent or reduce external air, water, or contaminants from permeating the display element layer DPL or the pixel circuit layer PCL.

Figure 4:
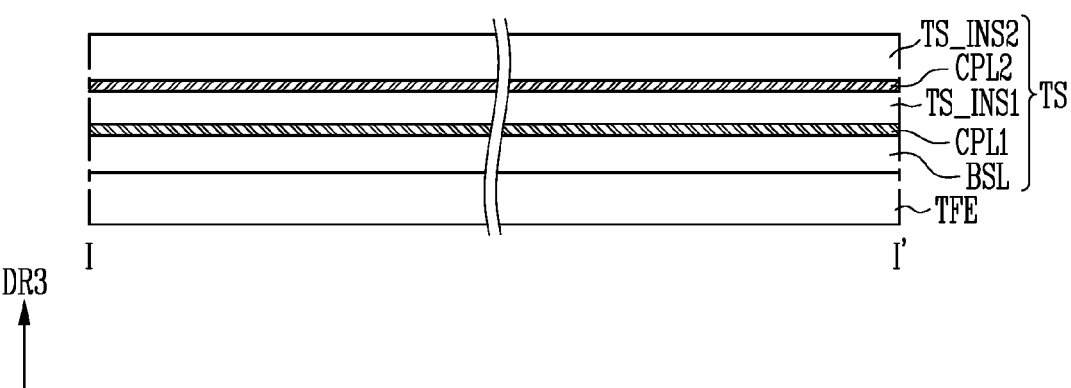
FIG. 4 is a sectional view illustrating aspects of a touch sensor of FIG. 2 according to some embodiments.

FIG. 4 is a sectional view illustrating further details of the touch sensor TS of FIG. 2 according to some embodiments.

Referring to FIG. 4, the touch sensor TS (or a touch array) may be directly located on an image display surface of the display panel DP to receive a touch input and/or hover input from the user. Here, "being directly located" implies that it may be formed through a successive process rather than being attached by a separate adhesive layer (or a temporarily adhesive layer). The touch sensor TS may recognize a touch input and/or hover input on the display device DD by detecting touch capacitance, which occurs through contact and/or proximity of the user's hand or a similar separate input tool such as a conductor. Here, "touch input" may refer to direct touch (or contact) by the user's hand or a separate input tool, while "hover input" may imply that the user's hand or the separate input tool is near the display device DD including the touch sensor TS but not making direct contact therewith.

The touch sensor TS may have a multilayer structure. The touch sensor TS may include at least one or more conductive layers, and at least one or more insulating layers.

The touch sensor TS may include a base layer BSL, a first conductive layer CPL1, a first insulating layer TS_INS1, a second conductive layer CPL2, and a second insulating layer TS_INS2.

The first conductive layer CPL1 may be directly located on the thin-film encapsulation layer TFE of the display panel DP, but embodiments according to the present disclosure are not limited thereto. According to some embodiments, another insulating layer, e.g., the base layer BSL, may be located between the first conductive layer CPL1 and the thin-film encapsulation layer TFE. In this case, the first conductive layer CPL1 may be directly located on the base layer BSL.

Each of the first and second conductive layers CPL1 and CPL2 may have a single-layer structure, or may have a multilayer structure in which layers are stacked in the third direction DR3. The conductive layer having a single-layer structure may include conductive material. For example, conductive material may include metal such as molybdenum (Mo), silver (Ag), titanium (Ti), copper (Cu), aluminum (Al), and an alloy thereof, or transparent conductive oxide such as indium tin oxide (ITO), indium zinc oxide (IZO), zinc oxide (ZnO), or indium tin zinc oxide (ITZO).

The conductive layer having a multilayer structure may include multiple metal layers. The multiple metal layers may have a triple structure of titanium (Ti)/aluminum (Al)/titanium (Ti), but is not limited thereto. The conductive layer having a multilayer structure may include multiple metal layers and a transparent conductive layer.

Figure 5:
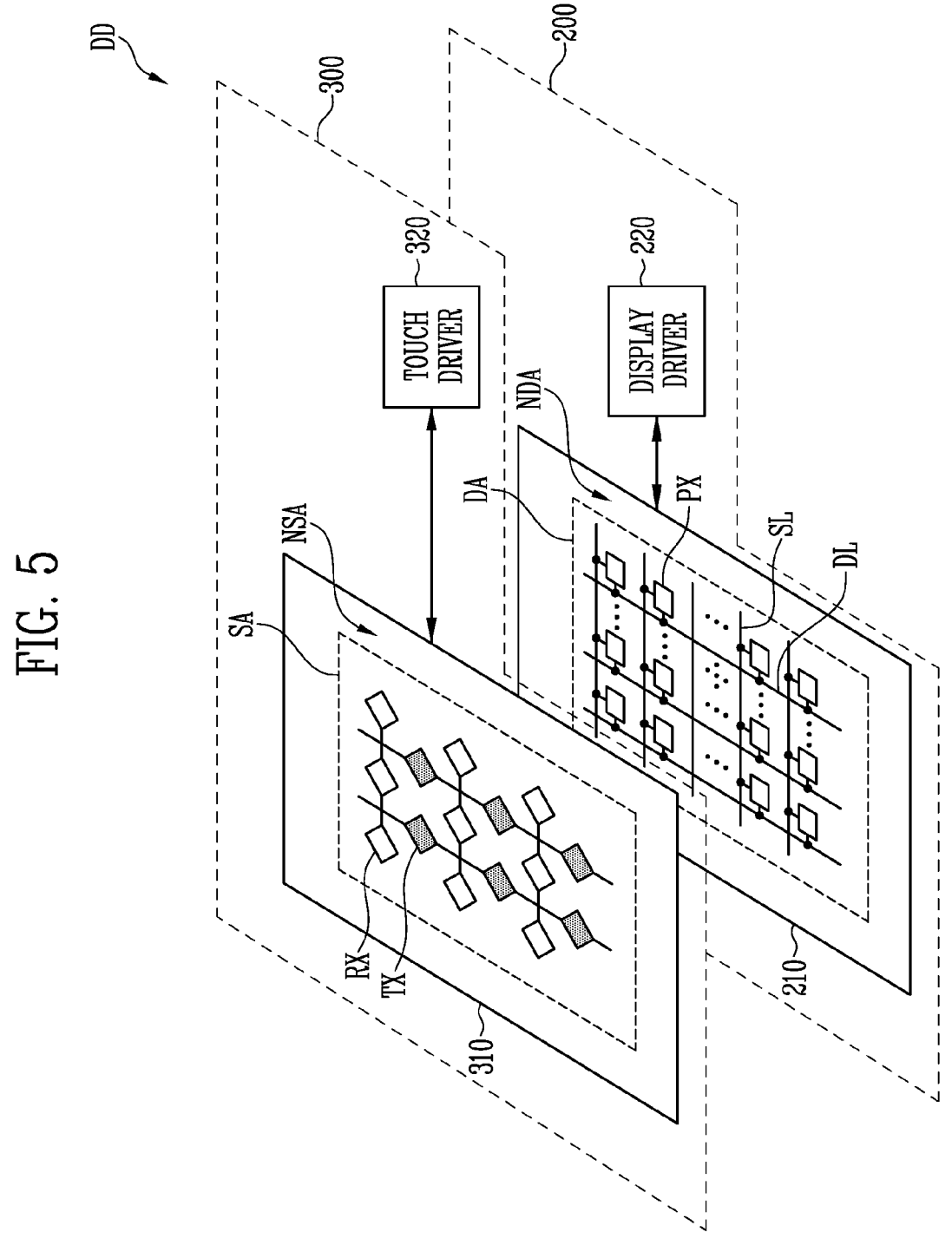
FIG. 5 is a block diagram illustrating aspects of the display device of FIG. 1 according to some embodiments.

According to some embodiments of the present disclosure, each of the first and second conductive layers CPL1 and CPL2 may include sensor patterns (refer to RX, TX in FIG. 5) and scan lines (refer to SL in FIG. 5).

Each of the first and second insulating layers TS_INS1, TS_INS2 may include inorganic material or organic material. The inorganic material may include at least one of silicon nitride ($SiN_x$), silicon oxide ($SiO_x$), silicon oxynitride (SiON), or metal oxide such as aluminum oxide ($AlO_x$). The organic material may include at least one of acrylic resin, methacrylic resin, polyisoprene, vinyl-based resin, epoxy-based resin, urethane-based resin, cellulose-based resin, siloxane-based resin, polyimide-based resin, polyamide-based resin, or perylene-based resin.

FIG. 5 is a block diagram illustrating further details of the display device DD of FIG. 1 according to some embodiments.

Referring to FIG. 5, the display device DD may include a display module 200 and a touch module 300. The display module 200 may include a display panel 210, a display driver 220 configured to drive the display panel 210. The touch module 300 may include a touch array 310 and a touch driver 320 configured to drive the touch array 310.

In embodiments, the display panel 210 and the touch array 310 may be manufactured separately from each other, and may be coupled to each other to at least partially overlap each other. In embodiments, the display panel 210 and the touch array 310 may be manufactured as an integrated body. Although in FIG. 5 the touch array 310 is illustrated as being arranged over the display panel 210, the touch array 310 is not limited thereto.

The display panel 210 may include pixels PX formed in a substrate. The pixels PX may be located in the display area DA. The pixels PX may be connected to scan lines SL and data lines DL. The pixels PX may be selected by turn-on level driving signals supplied through the scan lines SL, and may receive data signals through the data lines DL. Hence, the pixels PX may emit light with luminance corresponding to the data signals so that images may be displayed in the display area DA.

The touch array 310 may include a sensing area SA capable of sensing a touch, and a non-sensing area NSA formed around the sensing area SA. The sensing area SA may at least partially overlap the display area DA. The display device DD may not only display an image through the sensing area SA but may also sense touch input made on the display surface or sense light that is incident from the front. Although the non-sensing area NSA may enclose the sensing area SA, the aforementioned example is only for illustrative purposes, and embodiments according to the present disclosure are not limited thereto.

The touch array 310 may include a substrate, and touch electrodes TX and sensing electrodes RX that are formed on the substrate. The touch electrodes TX and the sensing electrodes RX may be located in the sensing area SA on the substrate.

According to some embodiments, the display driver 220 and the touch driver 320 may be formed of separate integrated chips (ICs). According to some embodiments, the display driver 220 and the touch driver 320 may be mounted in a single IC.

The display driver 220 may be electrically connected to the display panel 210 to drive the pixels PX. The touch driver 320 may be connected to the touch array 310 to drive the touch array 310. Detailed information regarding the touch array 310 and the touch driver 320 will be provided below with reference to FIG. 7.

The display driver 220 may display an image on the display panel 210 on a frame period basis. The touch driver 320 may sense touches on a frame period basis. For example, during a frame period, the touch driver 320 may transmit uplink signals from the touch electrodes of the touch array 310 to an external device, and receive a sensing signal from the external device, including a touch position on the touch array 310, to detect a touch from the user. Here, a frame period for display and a frame period for sensing may be synchronized with each other, or may be asynchronized.

Figure 6:
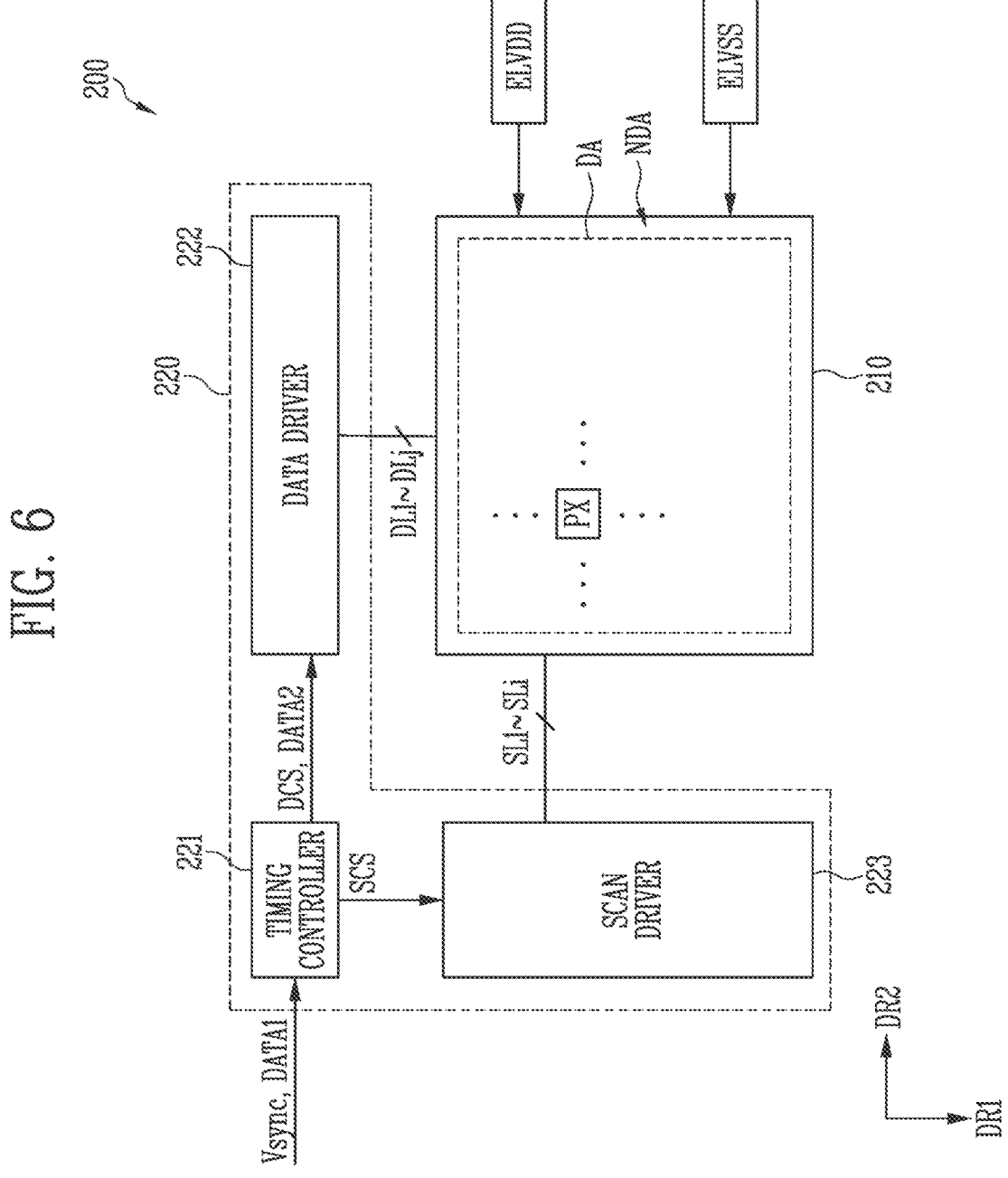
FIG. 6 is a block diagram illustrating aspects of a display module of FIG. 5 according to some embodiments.

FIG. 6 is a block diagram illustrating further details of the display module 200 of FIG. 5 according to some embodiments.

Referring to FIG. 6, the display module 200 may include a display panel 210 and a display driver 220. The display driver 220 may include a timing controller 221, a data driver 222, and a scan driver 223.

According to some embodiments, the display panel 210 may include pixels PX, and data lines DL1 to DLq and scan lines SL1 to SLp connected to the pixels PX.

The data driver 222 may receive a data driver control signal DCS and second image data DATA2 from the timing controller 221, thus generating a data signal. The data driver 222 may supply generated data signals to the data lines DL1 to DLq. For connection with the data lines DL1 to DLq, the data driver 222 may be directly mounted on the substrate provided with the pixels PX, or be connected to the substrate by a separate component such as a flexible circuit board.

The scan driver 223 may supply scan signals to the scan lines SL1 to SLp in response to a scan driver control signal SCS. For example, the scan driver 223 may sequentially supply scan signals to the scan lines SL1 to SLp. For connection with the scan lines SL1 to SLp, the scan driver 223 may be directly mounted on the substrate provided with the pixels PX, or be connected to the substrate by a separate component such as a flexible circuit board.

For example, if a scan signal is supplied to a specific scan line, some pixels PX connected to the specific scan line may receive data signals transmitted from the corresponding data lines DL1 to DLq. Thus, the some pixels PX may emit light with luminance corresponding to the received data signals.

The timing controller 221 may generate, using an external input signal, control signals to control the data driver 222 and the scan driver 223. For example, the control signals may include a scan driver control signal SCS for controlling the scan driver 223, and a data driver control signal DCS for controlling the data driver 222. The external input signal may include a data enable signal DE and a vertical synchronization signal Vsync. For example, the vertical synchronization signal Vsync may be a signal used to synchronize image data, and may be a signal inputted on a frame cycle to distinguish frames.

The timing controller 221 may provide the scan driver control signal SCS to the scan driver 223 and provide the data driver control signal DCS to the data driver 222. The timing controller 221 may translate first image data DATA1 inputted from an external device into second image data DATA2 corresponding to the specifications of the data driver 222, and then supply the second image data DATA2 to the data driver 222.

In FIG. 3, there is illustrated an example in which timing controller 221, the data driver 222, and the scan driver 223 are separately provided, but at least some of the foregoing components may be integrated with each other, as needed.

An electrode to which a voltage and/or signal to drive the display panel 210 is supplied may be referred to as a panel electrode. The panel electrode may correspond to the data lines DL1 to DLq, the scan lines SL1 to SLq, a first power supply ELVDD, a second power supply ELVSS, and the like. A driving voltage may be supplied to the panel electrode. For example, each of the pixels PX may generate light corresponding to a data signal by current flowing from the first power supply ELVDD to the second power supply ELVSS via the light emitting element. The first power source ELVDD may have a high potential voltage, and the second power source ELVSS may have a low potential voltage.

Figure 7:
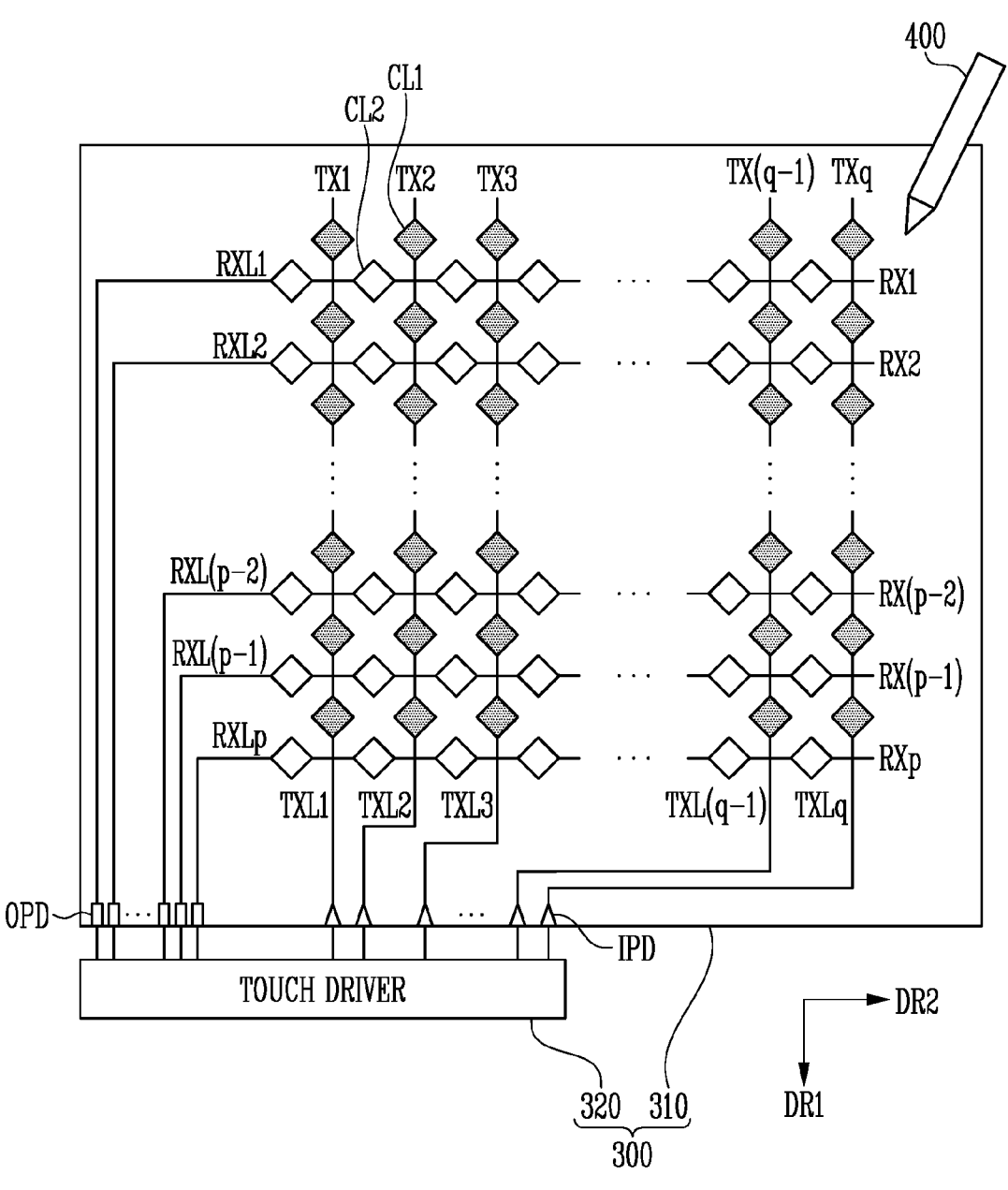
FIG. 7 is a block diagram illustrating aspects of a touch module of FIG. 5 according to some embodiments.

FIG. 7 is a block diagram illustrating further details of the touch module of FIG. 5 according to some embodiments.

Referring to FIG. 7, a touch array 310 may include first to q-th touch electrodes TX1 to TXq and first to p-th sensing electrodes RX1 to RXp. The first to q-th touch electrodes TX1 to TXq may be respectively connected to first to q-th driving lines TXL1 to TXLq. The first to p-th sensing electrodes RX1 to RXp may be respectively connected to first to p-th sensing lines RXL1 to RXLp.

Each of the first to q-th touch electrodes TX1 to TXq may include first cells CL1 that are arranged in the first direction DR1 and electrically connected to each other. Each of the first to p-th sensing electrodes RX1 to RXp may include second cells CL2 that are arranged in the second direction and electrically connected to each other. In FIG. 7, each of the first cells CL1 and the second cells CL2 is illustrated as having a diamond shape. Here, the diamond shape is only illustrative, and at least one of various shapes such as circular, rectangular, triangular, or mesh, may be used. Furthermore, each of the first cells CL1 and the second cells CL2 may be formed as a single layer or multiple layers. As such, the shapes and the arrangements of the first to q-th touch electrodes TX1 to TXq and the first to p-th sensing electrodes RX1 to RXp may be modified in various ways.

The touch array 310 may be provided as the touch array 310 of FIG. 5.

The touch array 310 may further include input pads IPD connected to the first to q-th driving lines TXL1 to TXLq. The touch driver 320 may be connected to the first to q-th driving lines TXL1 to TXLq through the input pads IPD. The touch array 310 may further include output pads OPD connected to the first to p-th sensing lines RXL1 to RXLp. The touch driver 320 may be connected to the first to p-th sensing lines RXL1 to RXLq through the output pads OPD.

The touch array 310 may include first touch electrodes, and second touch electrodes that form mutual capacitance with the first touch electrodes. The first touch electrodes may be provided as first to q-th touch electrodes TX1, TX2, TX3, . . . , TX(q−1), and TXq (where q is a positive integer). The second touch electrodes may be provided as first to p-th sensing electrodes RX1, RX2, . . . , RX(p−2), RX(p−1), and RXp (where p is a positive integer). The first to q-th touch electrodes TX1 to TXq may extend in the first direction DR1 and may be arranged to be spaced apart from each other in the second direction DR2. The first to p-th sensing electrodes RX1 to RXp may extend in the second direction DR2 and may be arranged to be spaced apart from each other in the first direction DR1. The first to p-th sensing electrodes RX1 to RXp may be electrically separated from the first to q-th touch electrodes TX1 to TXq while intersecting with the first to q-th touch electrodes TX1 to TXq, thus forming mutual capacitances with the first to q-th touch electrodes TX1 to TXq.

When a touch from the user is provided to the touch array 310, one or more of the mutual capacitances may change. For example, the touch may include at least one of various types of inputs such as physical contact with the user, and hovering that cause a change in mutual capacitance. The touch driver 320 may sense a change in such mutual capacitance and recognize the touch.

The touch driver 320 may be connected to the first to q-th touch electrodes TX1 to TXq through the first to q-th driving lines TXL1, TXL2, TXL3, . . . , TXL(q−1), and TXLq. The touch driver 320 is connected to the first to p-th sensing electrodes RX1 to RXp through the first to p-th sensing lines RXL1, RXL2, . . . , RXL(p−2), RXL(p−1), and RXLp.

The touch driver 320 may apply driving signals to the first to q-th touch electrodes TX1 to TXq through the first to q-th driving lines TXL1 to TXLq, and sense sensing signals from the first to p-th sensing electrodes RX1 to RXp through the first to p-th sensing lines RXL1 to RXLp. The touch driver 320 may sense changes in mutual capacitances based on the sensing signals.

According to some embodiments, the first to q-th driving lines TXL1 to TXLq are divided into a plurality of driving line groups. The touch driver 320 may simultaneously apply driving signals to the driving lines included in a single driving line group. For example, the touch driver 320 may employ a multi-channel driving scheme. The multi-channel driving scheme may reduce a duration of a single sensing frame period, while inducing relatively large electromagnetic interference (EMI) due to simultaneously applied driving signals.

The display device DD of FIG. 5 may transceive signals with an external device 400 through touch electrodes. The touch driver 320 may supply driving signals to the touch electrodes, thus transmitting uplink signals to the external device 400.

In the case where the external device 400 comes into contact or proximity with the touch electrodes on the touch array 310, the external device 400 may receive uplink signals. The external device 400 may decode the received uplink signals, thus determining a touch position of the external device 400 on the touch array 310. In embodiments, the external device 400 may be an active pen.

Figure 8:
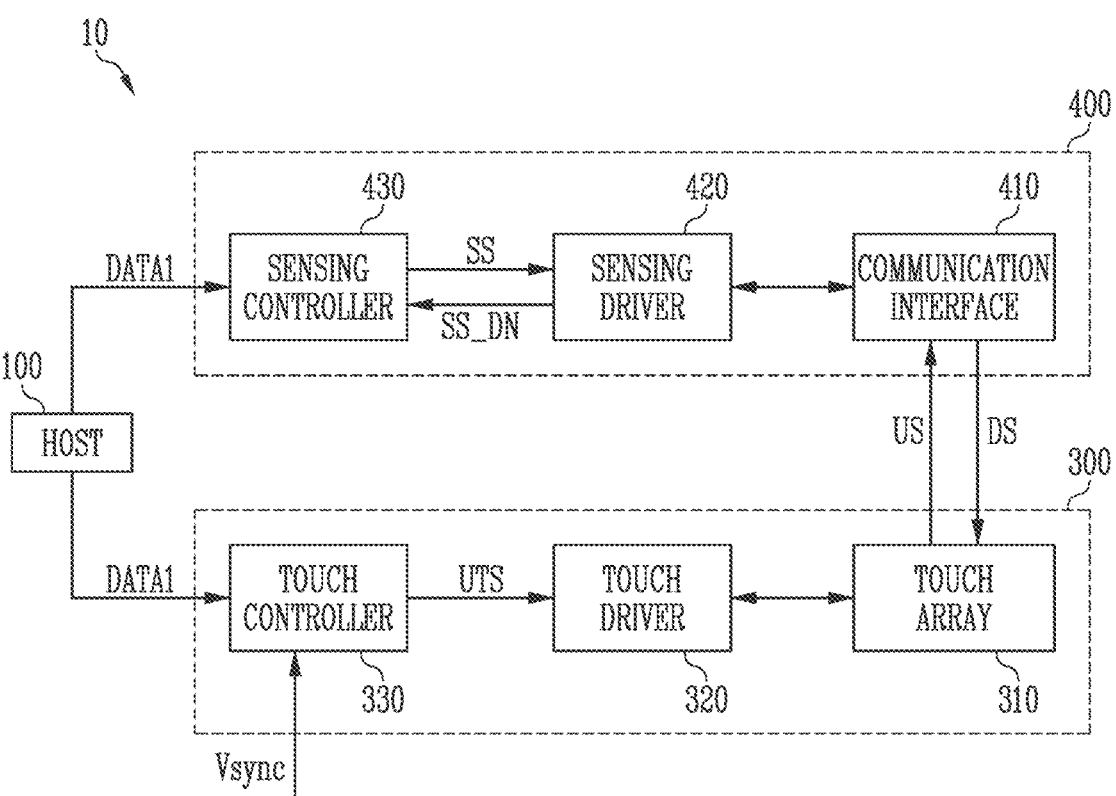
FIG. 8 is a block diagram illustrating aspects of the touch module of FIG. 5 and an external device according to some embodiments.

FIG. 8 is a block diagram illustrating further details of the touch module 300 of FIG. 5 and the external device 400 according to some embodiments.

Referring to FIGS. 5 and 8, the display system 10 may transceive uplink signals US and a downlink signal DS between the display device DD and the external device 400, thus sensing a touch position of the external device 400 on the touch array 310.

The display system 10 may include the display device 100 and the external device 400.

The display device DD may include the display module 200 of FIG. 6 and the touch module 300 of FIG. 7. In FIG. 8, for the sake of convenience in explanation, the display module 200 is omitted. The touch module 300 may include a touch array 310, a touch driver 320, and a touch controller 330.

The external device 400 may be configured to communicate with the display device DD through the touch array 310 of the touch module 300.

The display device DD may transmit uplink signals US to the external device 400 through the touch electrodes included in the touch array 310 during an uplink period. Each of the uplink signals US refers to position information of the corresponding touch electrode. According to some embodiments, each of the uplink signals US may be an identifier of the corresponding touch electrode. The display device DD may receive a sensing signal generated by the external device 400 as the downlink signal DS from the external device 400.

According to some embodiments of the present disclosure, the display device DD may determine an uplink period based on image data DATA1, and transmit the uplink signals US in the determined uplink period. The external device 400 may process at least one uplink signal among the uplink signals US and generate a sensing signal related to the position of the external device 400 on the touch array 310, while removing noise components from the sensing signal that may be caused by the image data DATA1.

The host 100 may provide the image data DAT1 to the display device DD and the external device 400. According to some embodiments, the host 100 may include an application processor, a central processing unit (CPU), and the like to control the display device DD. According to some embodiments, the host 100 may include a graphic processing unit (GPU) to control the display device DD. In addition, the host 100 may include at least one of various devices configured to provide the image data DATA1 to the display device DD. The host 100 may receive a touch position of the external device 400 on the touch array 310, and perform various operations using the received touch position.

The host 100 may transmit the image data DATA1 to the touch controller 330. The host 100 may transmit the image data DATA1 to a sensing controller 430 of the external device 400. According to some embodiments, the host 100 may provide the image data DATA1 to the sensing controller 430 through a communication module that supports at least one of various communication schemes, such as Bluetooth® communication.

The touch controller 330 may determine an uplink period to transmit the uplink signals US based on the image data DATA1. The touch controller 330 may periodically receive the vertical synchronization signal Vsync, which defines a frame period including an active period and a blank period. The touch controller 330 may determine the uplink period further based on the vertical synchronization signal Vsync. The touch controller 330 may transmit an uplink timing signal UTS, representing the determined uplink period, to the touch driver 320.

The touch controller 330 may determine the uplink period with reference to grayscale levels of data pixels in the image data DATA1. According to some embodiments, the touch controller 330 may estimate noise components caused by the image data DATA1 with reference to a difference in grayscale levels between the data pixels based on a preset sensing area for each pixel unit or pixel line unit in a current frame. Here, the image data DATA1 may include data of RGB pixels. The RGB pixels may have respective grayscale levels. For example, the touch controller 330 may estimate noise components for respective data pixels from the image data DATA1 representing the grayscale levels for the respective data pixels in each frame period, using a lookup table that stores noise components for each grayscale level. More specifically, the noise components stored in the lookup table can more intensively occur as the difference in grayscale levels of adjacent data pixels increases. The noise components may be calculated using an average of the grayscale levels of the data pixels included in the preset sensing area.

The touch controller 330 may determine the uplink period to overlap the active period in the frame period based on the image data DATA1. The touch controller 330 may determine the uplink period to further overlap a blank period provided after the active period in the frame period or a blank period provided before the active period.

According to some embodiments, the touch controller 330 may compare data pixels of the image data (DATA1) to be displayed on adjacent pixels among the data pixels, and may overlap, based on a result of the comparison, the uplink period with a time period in which the adjacent pixels emit light in the active period. Alternatively, the touch controller 330 may overlap, based on the result of the comparison, the uplink period with time periods other than the time period in which the adjacent pixels emit light in the active period. For example, the touch controller 330 may estimate the noise components based on a difference in grayscale level between the adjacent data pixels by comparing the data pixels of the image data DATA1.

In the case where the difference in grayscale level between the data pixels in a single frame period is relatively large, the touch controller 330 may estimate a noise period in which the noise components are concentrated. Therefore, the touch controller 330 may overlap the uplink period to avoid the estimated noise period in the active period. Here, the touch controller 330 may perform a series of processes to estimate the noise period from the image data DATA1 and determine the uplink period within one frame period. Detailed description of the uplink period will be made below with reference to FIGS. 9 to 12.

The touch driver 320 may transmit uplink signals US through the touch array 310 with reference to the uplink timing signal UTS received from the touch controller 330. The touch driver 320 may transmit the uplink signals US including different information through the touch electrodes of the touch array 310 to the external device 400 in the uplink period determined by the touch controller 330, thereby transmitting the uplink signals US in a period in which the noise components caused by the image data DATA1 are minimized or reduced.

When coming into contact or proximity with the touch electrodes of the touch array 310, the external device 400 may receive the uplink signals US from the touch electrodes through a communication interface 410. For example, as the external device 400 comes into contact or proximity with the touch electrodes, electric fields may be generated between the communication interface 410 of the external device 400 and the touch electrodes. Virtual capacitors due to the electric fields may be formed between the external device 400 and the touch electrodes. As the external device 400 approaches the touch electrodes, the capacitances of the formed capacitors may decrease. As a result, the transmission of the uplink signals US from the touch electrodes of the touch array 310 to the communication interface 410 of the external device 400 can be facilitated.

The communication interface 410 may perform an operation of amplifying the received uplink signals US. The uplink signals US amplified by the communication interface 410 may be received in the form of input signals and transmitted to the sensing driver 420.

The sensing driver 420 may generate a sensing signal SS_DN by decoding the uplink signals US based on a modulation matrix associated with the driving signals. The sensing signal SS_DN may be transmitted from the sensing driver 420 to the sensing controller 430.

The sensing signal SS_DN transmitted to the sensing controller 430 may include the noise components caused by the image data DATA1. Given this, the sensing controller 430 may be configured to include a separate signal processing circuit to offset the noise components. The sensing controller 430 may analyze the image data DATA1 to estimate the noise components based on the grayscale levels, and offset the noise components from the sensing signal SS_DN.

According to some embodiments, the sensing controller 430 may perform filtering on the sensing signal SS_DN based on the grayscale levels of the data pixels in the image data DATA1. For example, the sensing controller 430 may use the lookup table that stores noise components for each grayscale level to filter out noise components exceeding a reference level among the noise components estimated from the image data DATA1 in each frame period. For example, the sensing controller 430 may specify data pixels that generate noise components exceeding the reference level, and adjust the grayscale levels of the corresponding data pixels to reduce the grayscale levels. Alternatively, the sensing controller 430 may generate an inverted signal corresponding to the estimated noise components and add the inverted signal to the sensing signal. However, the aforementioned example is illustrative, and is not limited so long as it can offset the noise components. A sensing signal SS from which the noise components caused by the image data DATA1 have been offset may be retransmitted to the sensing driver 420.

The sensing driver 420 may calculate touch position information of the external device 400 using the sensing signal SS from which the noise components have been offset. Here, the touch position information may be a digital signal including touch position coordinates on the touch array 310 where the external device 400 comes into contact or proximity. The sensing driver 420 may transmit the sensing signal SS to the touch driver 110 as a downlink signal DS.

The touch driver 110 may receive the downlink signal DS transmitted from the external device 400, through the touch electrodes of the touch array 310. The downlink signal DS may include the touch position information of the external device 400 acquired through decoding by the external device 400. Furthermore, the downlink signal DS may further include status information about the external device 400 such as a button status, a battery status, an inclination at which the external device 400 contacts the touch array 310, and the like.

The touch driver 110 may transmit the touch position information to the host 100. However, the downlink signal DS pertains to an example in which the external device 400 transmits the touch position information. If the communication interface 410 of the external device 400 supports wireless communication such as Bluetooth®, the sensing driver 420 may also directly transmit the touch position information to the host 100 through the wireless communication.

Figure 9:
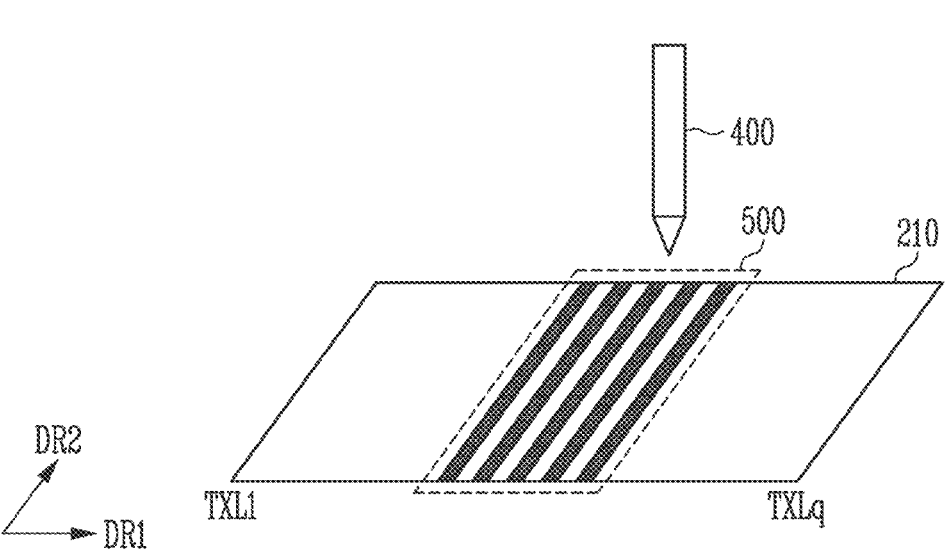
FIG. 9 is a diagram for describing an example of noise that may be included in uplink signals according to some embodiments.
Figure 9:
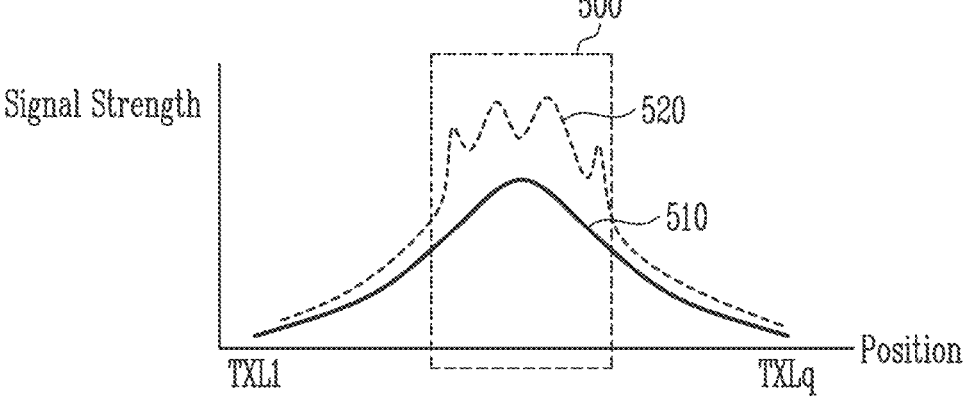

FIG. 9 is a diagram for describing an example of noise that may be included in uplink signals.

Referring to the graph depicted in FIG. 9, with regard to the case where there is significant data variation between the data lines in a single frame period, signal strength of the uplink signals US for each of the first to p-th touch electrode lines RXL1 to RXLp arranged in the first direction DR1 may be explained.

According to some embodiments, in the case where the external device 400 comes into contact or proximity with a specific area of the touch array 310, the uplink signals US may be transmitted to the external device 400 through the touch electrode lines corresponding to the specific area among the first to p-th touch electrode lines RXL1 to RXLp. Hence, the signal strength 510 of the uplink signals US may be relatively high on the touch electrode lines corresponding to the specific area among the first to p-th touch electrode lines RXL1 to RXLp.

Here, in the case where there is relatively large data variation between the data pixels depending on the image data corresponding to the single frame period, the uplink signals US transmitted from the display device DD to the external device 400 may contain noise components caused by the image data. For example, in the case where a pattern area 500 where white and black alternate in the image data, the data pixels corresponding to the pattern area 500 may generate noise components due to a difference in grayscale level between adjacent data pixels. The noise components caused by the image data may influence the touch electrode lines corresponding to the data pixels through parasitic capacitance or the like. Therefore, in a specific time period, noise components due to the image data may be contained in the uplink signals US transmitted through the touch electrode lines arranged in the pattern area 500.

Particularly, in the case where the specific area on the touch array 310 that is brought into contact or proximity with the external device 400 overlaps the corresponding pattern area 500, the signal strength 520 of the uplink signals US may be relatively high in the form of including noise components in the touch electrode lines corresponding to the specific area. As the uplink signals US containing the noise components are transmitted to the external device 400, the touch position information of the external device 400 may be incorrectly sensed. Therefore, the display device DD may determine the uplink period to overlap the active period while avoiding a time period where noise components caused by the image data are concentrated, and transmit uplink signals to the external device 400 during the determined uplink period.

Figure 10:
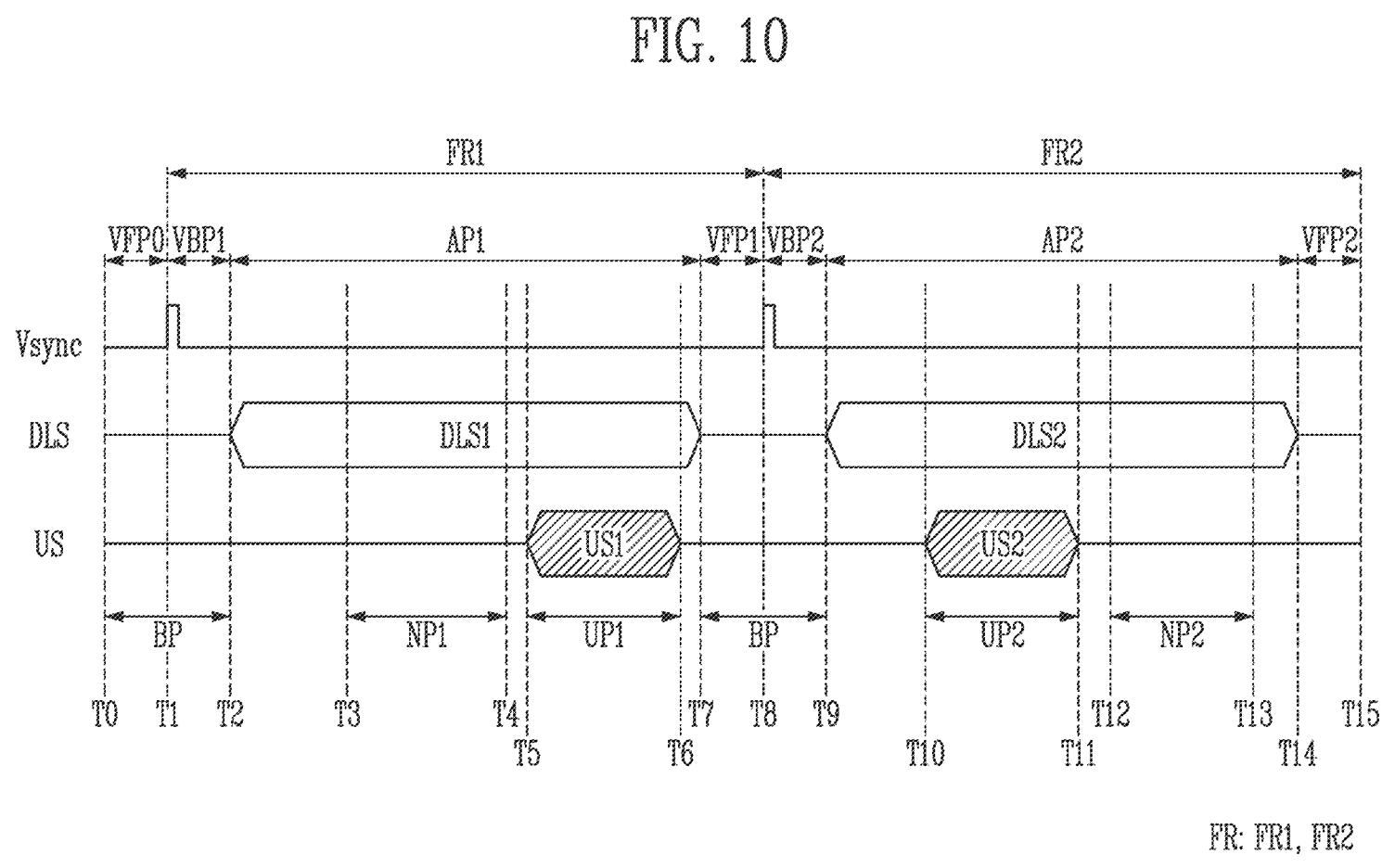

FIG. 10 is a timing diagram illustrating further details of a method of transmitting uplink signals according to some embodiments.

Referring to FIGS. 5 and 10, each frame period may include an active period in which the display panel 210 displays an image, and a blank period BP in which the display panel 210 does not display an image. For example, a first frame period FR1 may include a first active period AP1 and blank periods BP provided before/after the first active period AP1. A second frame period FR2 may include a second active period AP2 and blank periods BP provided before/after the second active period AP2.

Each blank period BP may be positioned between the first active period AP1 and the second active period AP2. For example, the blank period BP of the first frame period FR1 may include a first back porch period VBP1 and a first front porch period VFP1. The blank period BP of the second frame period FR2 may include a second back porch period VBP2 and a second front porch period VFP2. A zeroth front porch period VFP0 may be included in a zeroth frame period before the first frame period FR1. The second front porch period VFP2 may be included in a third frame period after the second frame period FR2.

The display device DD may operate in units of frames periods FR divided from each other by the vertical synchronization signals Vsysnc. The vertical synchronization signals Vsysnc may include a high level period and a low level period. The cycle of the vertical synchronization signals Vsysnc may correspond to the cycle of the frame period FR. For example, a first time point T1 may be a time point at which the vertical synchronization signals Vsysnc makes a transition to a high level, and correspond to a time point at which the first frame period FR1 starts. An eighth time point T8 may be a time point at which the vertical synchronization signals Vsysnc makes a transition to a high level, and correspond to a time point at which the second frame period FR2 starts.

Each frame period FR may include an uplink period in which uplink signals US are transmitted from the touch array 310 to the external device 400. Particularly, in the case where the display device DD has an increased resolution or is used along with a finger touch sensing scheme, there may be a shortage of the uplink periods for transmitting uplink signals. In this case, as illustrated in FIG. 10, in each frame period, the display device DD may determine the uplink period to overlap the active period.

A first image frame may be received as image data for the first frame period FR1. At a second time point T2, the display device DD may provide first data signals DLS1 as data signals DLS in response to the first image frame. The data signals DLS may be voltages applied to the first to q-th data lines DL1 to DLq (refer to FIG. 6) to display a valid image in the corresponding frame period. A time period in which the data signals DLS are applied to the first to q-th data lines DL1 to DLq to display an image may be defined as an active period. Referring to FIG. 10, the first data signals DLS1 are applied between the second time point T2 and a sixth time point T6. Therefore, the time period between the second time point T2 and the sixth time point T6 may be defined as the first active period AP1.

If the first image frame includes a pattern area where white and black alternate, noise components may intensively occur in a time period between a third time point T3 and a fourth time point T4 in which data signals corresponding to the pattern area are applied. Given this, the display device DD may determine a first uplink period UP1 to overlap a time period other than a first noise period NP1 in which the noise components intensively occur within the first active period AP1 of the first frame period FR1. The first uplink period UP1 may overlap a time period between a fifth time point T5 and a sixth time point T6 that is the time period other than the first noise period NP1. The display device DD may transmit first uplink signals US1 in the first uplink period UP1 of the first frame period FR1.

A second image frame may be received as image data for the second frame period FR2 following the first frame period FR1. At a ninth time point T9, the display device DD may provide, in response to the second image frame, second data signals DLS2 to the display panel 210 through the data lines DL1 to DLq as data signals DLS. In a time period between the ninth time point T9 and a fourteenth time point T14, the second data signals DLS2 may be applied. The time period between the ninth time point T9 and a fourteenth time point T14 may be defined as the second active period AP2.

If the second image frame includes a pattern area where white and black alternate at a different position, the time period in which the data signals corresponding to the pattern area are applied may change. In the second frame period FR2, noise components may intensively occur during a time period between a twelfth time point T12 and a thirteenth time point T13. Given this, the display device DD may determine a second uplink period UP2 to overlap a time period other than a second noise period NP2 in which the noise components intensively occur within the second active period AP2 of the second frame period FR2. The second uplink period UP2 may overlap a time period between a tenth time point T10 and an eleventh time point T11 that is the time period other than the second noise period NP2. The display device DD may transmit second uplink signals US2 in the second uplink period UP2 of the second frame period FR2.

As such, the first uplink period UP1 may overlap the time period where the noise components caused by the image data are minimized or reduced within the first active period AP1 of the first frame period FR1. The second uplink period UP2 may overlap the time period where the noise components caused by the image data are minimized or reduced within the second active period AP2 of the second frame period FR2. For example, the uplink period may be set to different time periods for respective frame periods. Accordingly, the influence of the noise components on the transmission of uplink signals may be minimized or reduced, whereby the sensing accuracy can be enhanced.

Figure 11:
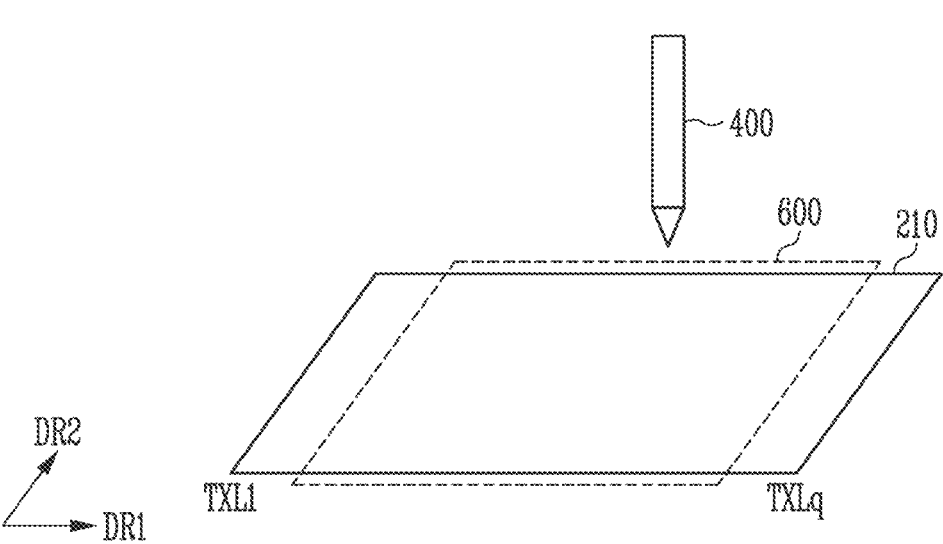
FIG. 11 is a diagram for describing another example of noise that may be included in uplink signals.
Figure 11:
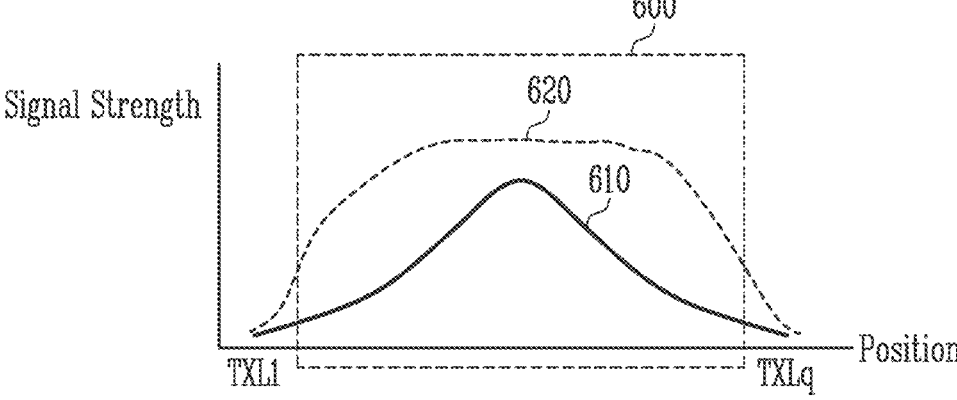

FIG. 11 is a diagram for describing another example of noise that may be included in uplink signals.

Referring to the graph depicted in FIG. 11, with regard to the case where, in successive frame periods, there is significant data variation between the frame periods, signal strength of the uplink signals US for each of the first to p-th touch electrode lines RXL1 to RXLp arranged in the first direction DR1 can be explained.

According to some embodiments, in the case where the external device 400 comes into contact or proximity with a specific area of the touch array 310, the uplink signals US may be transmitted to the external device 400 through the touch electrode lines corresponding to the specific area among the first to p-th touch electrode lines RXL1 to RXLp. Hence, the signal strength 610 of the uplink signals US may be relatively high on the touch electrode lines corresponding to the specific area among the first to p-th touch electrode lines RXL1 to RXLp.

Here, in the case where there is relatively large data variation between the frame periods depending on the image data corresponding to the successive frame periods, the uplink signals US transmitted from the display device DD to the external device 400 may contain noise components caused by the image data. For example, in scenarios such as a flash occurring in a dark scene, if a previous frame period with a black background is converted to a current frame period with a white background, noise components may occur in the data pixels corresponding to an entire area 600 due to differences in grayscale levels between successive=frame periods. The noise components caused by the image data may influence the touch electrode lines corresponding to the data pixels through parasitic capacitance or the like. Therefore, noise components due to the image data may be entirely contained in the uplink signals US transmitted through the touch electrode lines arranged in the entire area 600.

In another example, when transitioning from a previous frame period with a white background to a current frame period with patterns alternating in the entire area 600, noise components may occur in the data pixels corresponding to the entire area 600 in the current frame period due to differences in grayscale levels. Therefore, the noise components due to the image data may be included overall in the uplink signals US.

Particularly, the signal strength 620 of the uplink signals US may be relatively high in the form of including noise components in the overall area other than the touch electrode lines corresponding to the specific area on the touch array 310 with which the external device 400 comes into contact or proximity. As the uplink signals US containing the noise components are transmitted to the external device 400, the touch position information of the external device 400 may be incorrectly sensed. Therefore, the display device DD may determine the uplink period to overlap the active period and the periods before/after the active period while avoiding a time period where noise components caused by the image data are concentrated, and transmit uplink signals to the external device 400 during the determined uplink period. Furthermore, in the case where noise components are included overall, the external device 400 may calculate the noise components with reference the grayscale levels of the data pixels in the image data, and then offset the calculated noise components from a sensing signal generated using the received uplink signals.

Figure 12:
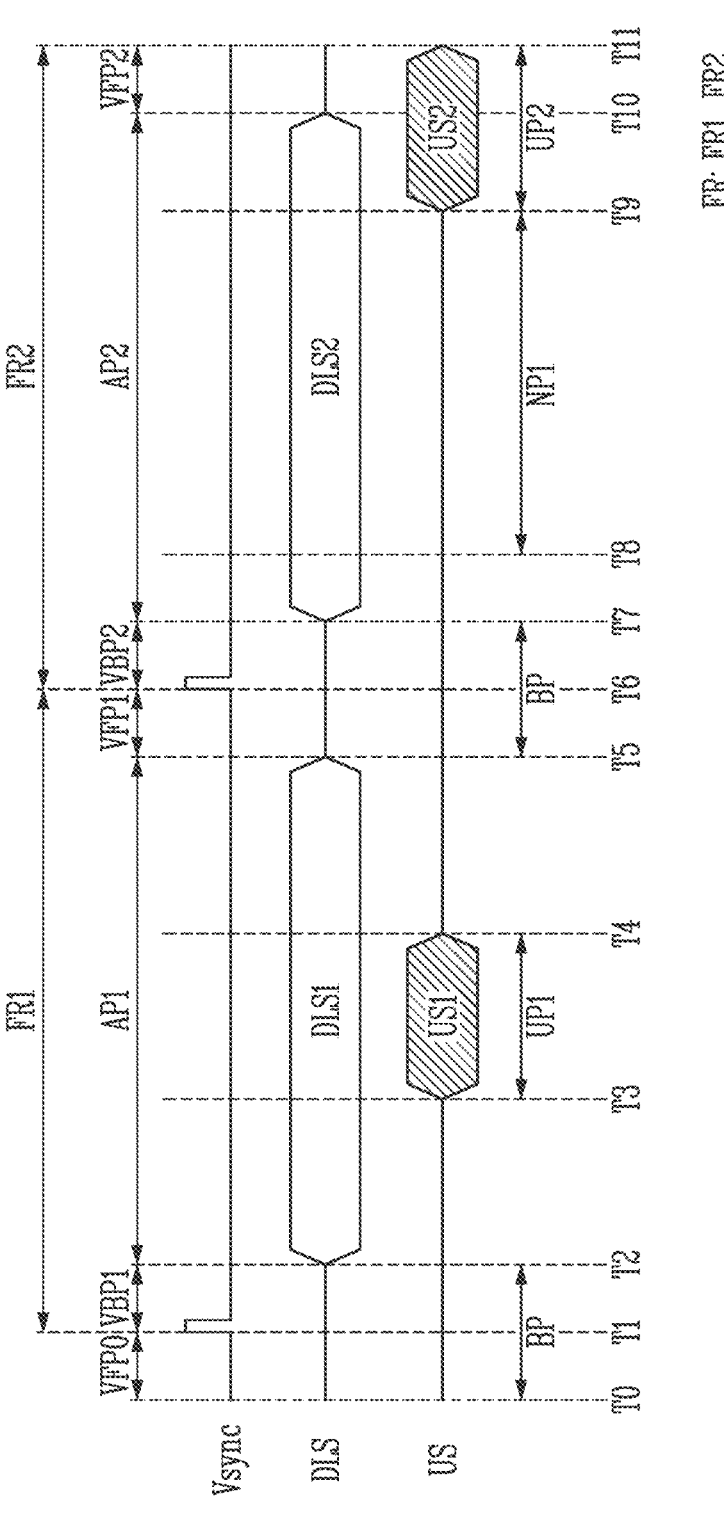
FIG. 12 is a timing diagram illustrating aspects of a method of transmitting uplink signals according to some embodiments.

FIG. 12 is a timing diagram illustrating an example a method of transmitting uplink signals according to some embodiments.

Referring to FIGS. 5 and 12, an operation of the display device DD transmitting uplink signals to the external device 400 can be described in the case where, successive frame periods, there is large data variation between the frame periods. Here, an operation in the frame period is the same as that in the frame period described with reference to FIG. 10; therefore, redundant explanation thereof will be omitted.

A first image frame with a black background may be received as image data for a first frame period FR1. At a second time point T2, the display device DD may provide first data signals DLS1 as data signals DLS in response to the first image frame. Referring to FIG. 12, the first data signals DLS1 are applied between a second time point T2 and a fifth time point T5. Therefore, the time period between the second time point T2 and the fifth time point T5 may be defined as a first active period AP1. The display device DD may transmit first uplink signals US1 in a first uplink period UP1 of the first frame period FR1.

On the other hand, a second image frame with a white background may be received as image data for a second frame period FR2 following the first frame period FR1. At a seventh time point T7, the display device DD may provide second data signals DLS2 as data signals DLS in response to the second image frame. Referring to FIG. 12, the second data signals DLS2 are applied between the seventh time point T7 and a tenth time point T10. Therefore, the time period between the seventh time point T7 and the tenth time point T10 may be defined as a second active period AP2. The display device DD may transmit second uplink signals US2 in a second uplink period UP2 of the second frame period FR2.

The display device DD may compare data pixels according to the first data signals DLS1 in the first image frame and the second data signals DLS2 in the second image frame with each other. The display device DD may determine the second uplink period UP2 to overlap a time period other than a time period in which some pixels emit light in the second active period AP2 of the second frame period FR2, depending on a result of the comparison.

The second data signals DLS2 corresponding to the second image frame may be signals different from the first data signals DLS1 corresponding to the first image frame. Therefore, the data pixels may exhibit differences in grayscale level between frame periods. Particularly, in the case where there is relatively large variation between the first image frame and the second image frame, the data signals DLS between the first frame period FR1 and the second frame period FR2 may also exhibit considerable variation. In this case, noise components may occur overall in the second active period AP2 of the second frame period FR2. More specifically, the second frame period FR2, noise components may occur during a time period between an eighth time point T8 and a ninth time point T9.

Given this, the display device DD may determine a second uplink period UP2 to overlap a time period other than a first noise period NP1 in which the noise components intensively occur within the second active period AP2 of the second frame period FR2. The second uplink period UP2 may overlap a time period between the ninth time point T9 and an eleventh time point T11. The display device DD may transmit second uplink signals US2 in some periods of the second active period AP2 and a blank period VFP2 provided after the second active period AP2.

As such, in successive frame periods, the first uplink period UP1 may overlap the time period where the noise components caused by the image data are minimized or reduced within the first active period AP1 of the first frame period FR1. The second uplink period UP2 may overlap the time period where the noise components caused by the image data are minimized or reduced within the second active period AP2 of the second frame period FR2. However, if noise components due to the image data occur overall in the corresponding frame period, the uplink period may also selectively overlap the blank period successive to the corresponding active period. Accordingly, the influence of the noise components on the transmission of uplink signals may be minimized or reduced. Furthermore, the display device DD may select the transmission frequency of an uplink signal without limitation, thus enhancing the degree of freedom, and facilitating high-speed operation. Furthermore, the display device DD may apply a low voltage for transmitting the uplink signal, thus providing the benefit of reducing the potential for image quality degradation and overall power consumption.

Figure 13:
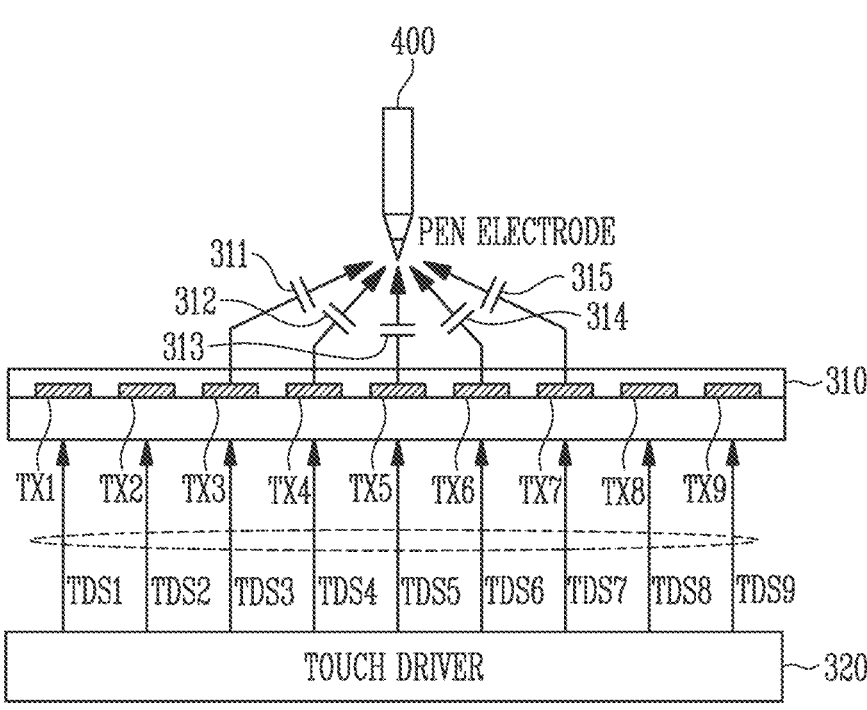
FIG. 13 is a diagram for describing processes for determining the position of an external device in such a way that the external device receives at least one uplink signal according to some embodiments.

FIG. 13 is a diagram for describing processes for determining the position of an external device in such a way that the external device receives at least one uplink signal.

Referring to FIG. 13, an operation in which the external device 400 receives uplink signals through capacitors formed between the external device 400 and adjacent touch electrodes can be explained.

As illustrated in FIG. 13, the touch driver 320 may apply respective touch driving signals TDS1 to TDS9 including different position information to the first to ninth touch electrodes TX1 to TX9 of the touch array 310. If the external device 400 is adjacent to the touch array 310, the external device 400 may receive uplink signals through capacitors formed between the external device 400 and adjacent touch electrodes TX3 to TX7. The external device 400 may obtain capacitance information of the capacitors 311 to 315 formed by the corresponding touch electrodes from the uplink signals. For example, the uplink signal transmitted from the fifth touch electrode TX5 closest to the external device 400 may include capacitance information of the capacitor 313 formed between the fifth touch electrode TX5 and the external device 400. The uplink signals transmitted from the respective third to seventh touch electrodes TX3 to TX7 may include both digital components corresponding to respective touch driving signals TDS3 to TDS7 with different position information and analog components related to the capacitance information of the capacitors 311 to 315.

The sensing driver 420 of the external device 400 may decode the received uplink signals from the adjacent touch electrodes TX3 to TX7 and apply the decoded uplink signals to a preset algorithm, thus calculating the position information of the external device 400. Here, the position information of the external device 400 may be calculated from the respective digital components included in the touch driving signals TDS3 to TDS7 including different position information. For example, the sensing driver 420 may estimate respective eigenvectors from the decoded uplink signals, and calculate the position information of the external device 400 by allocating a certain weight to each of the eigenvectors.

However, it should be noted that the touch electrodes illustrated in FIG. 13 are described as including nine touch electrodes TX1 to TX9 for the sake of example, but the number of touch electrodes is not limited thereto. Furthermore, the same principles may also be applied to the sensing electrodes RX1 to RXN.

Figure 14:
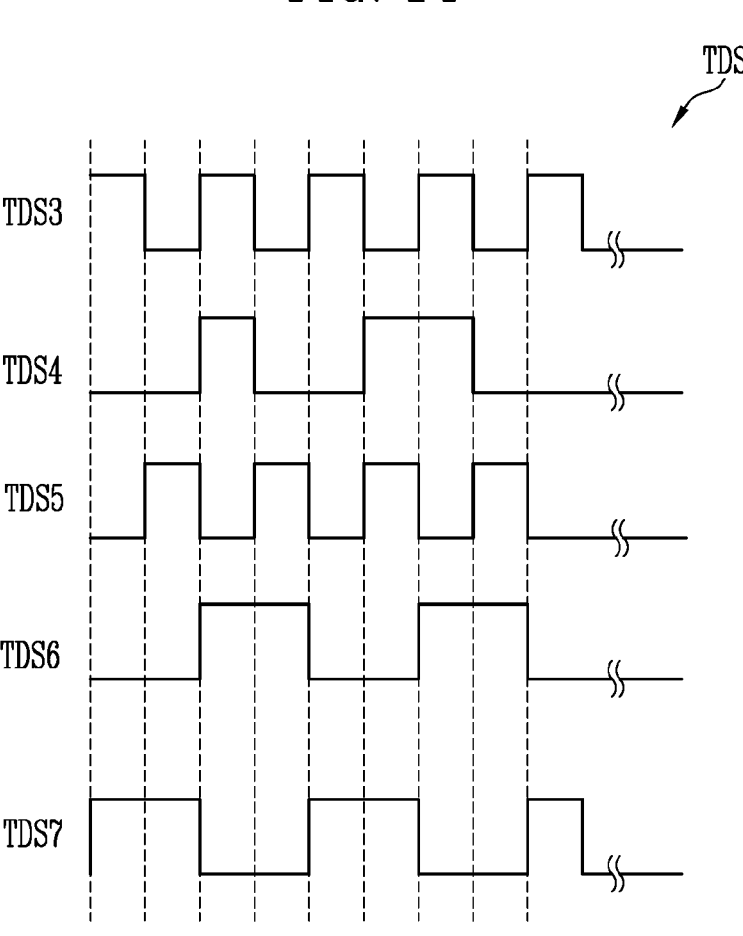
FIG. 14 is a timing diagram illustrating a signal applied to each touch electrode of FIG. 13 according to some embodiments.

FIG. 14 is a timing diagram illustrating an example a signal applied to each touch electrode of FIG. 13 according to some embodiments.

Referring to FIG. 14, it can be explained the touch driving signals applied to the third to seventh touch electrodes TX3 to TX7 to which the external device 400 is adjacent. The touch driving signals may be encoded based on different position information, and may be signals of digitally modulated components based on the encoding. The touch driving signals may be generated as signals in various waveforms such as pulses, sinusoidal waves, and triangular waves.

According to some embodiments, the touch driving signals may be pulse signals in different forms including 1 or 0 in a plurality of bit columns. For example, the touch driving signal TDS3 applied to the third touch electrode TX3 may be a signal of a digital component including 101010101. The touch driving signal TDS4 applied to the fourth touch electrode TX4 may be a signal of a digital component including 001001100. The touch driving signal TDS5 applied to the fifth touch electrode TX5 may be a signal of a digital component including 010101010. The touch driving signal TDS6 applied to the sixth touch electrode TX6 may be a signal of a digital component including 001100110. The touch driving signal TDS7 applied to the seventh touch electrode TX7 may be a signal of a digital component including 110011001. However, it should be noted that the aforementioned description of the touch driving signals including different position information is only for the sake of example and not limited thereto.

Figure 15:
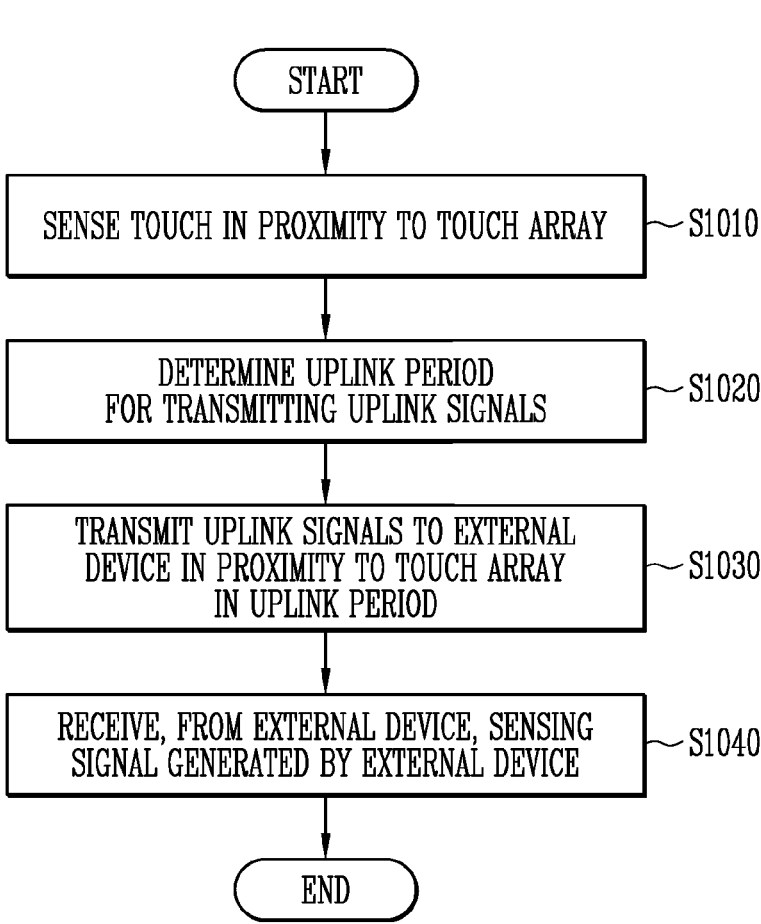
FIG. 15 is a flowchart illustrating a method of driving the display device according to some embodiments of the present disclosure.

FIG. 15 is a flowchart illustrating a method of driving the display device according to some embodiments of the present disclosure.

In the following description with reference to FIG. 15, there will be provided a method in which the display device transmits uplink signals to the external device and receives sensing signals from the external device to detect touches. Here, the display device operates in units of frame periods each including an active period and a blank period, and may display an image on the display panel in the active period of the frame period based on the image data.

Referring to FIGS. 5 and 13, at step S1010, the display device DD may sense a touch in proximity to the touch array 310.

At step S1020, the display device DD may determine an uplink period based on image data. The touch controller 330 may determine the uplink period with reference to grayscale levels of the data pixels in the image data. For example, the display device DD may compare the data pixels of image data to be displayed on adjacent pixels among the pixels and, based on a result of the comparison, determine the uplink period to overlap a time period in which the adjacent pixels emit light in the active period or a time period other than the time period in which the adjacent pixels emit light. As a result, the uplink period may overlap a period in which noise components caused by the image data are minimized or reduced within the active period, and may also overlap blank periods provided before/after the active period.

At step S1030, the display device DD may transmit uplink signals to the external device 400 adjacent to the touch array 310 in the determined uplink period. The display device DD may encode data representing the position information of the respective touch electrodes, thus generating uplink signals US. The position information of the respective touch electrodes may be different information as respective identifiers of the touch electrodes. The display device DD may transmit the uplink signals US representing the touch position information of the external device 400 to the external device 400 in the uplink period in which the noise components caused by the image data are minimized or reduced. The uplink signals US to be transmitted may further include a synchronization signal Vsync, panel information, information about a protocol version, and the like.

At step S1040, the display device DD may receive, from the external device 400, a sensing signal generated by the external device 400.

The external device 400 may calculate the noise components with reference the grayscale levels of the data pixels in the image data, and then offset the calculated noise components from a sensing signal generated using the received uplink signals. The display device DD may receive the sensing signal from which the noise components are offset, as a downlink signal DS from the external device 400. The downlink signal DS may include touch position information of the external device 400 on the touch array 310 acquired through decoding by the external device 400. The downlink signal DS may further include status information of the external device 400.

Aspects of some embodiments of the present disclosure may include a touch device and touch system capable of recognizing the position of an external device on a touch array with relatively improved reliability.

The effects of the present disclosure are not limited by the foregoing, and other various effects are anticipated herein.

Although certain embodiments and implementations have been described herein, other embodiments and modifications will be apparent from the foregoing description. Accordingly, the concepts of the present disclosure are not limited to the foregoing embodiments, but rather to the broader scope of the presented claims and various obvious modifications and equivalent arrangements.

What is claimed is:

1. A display device, comprising:
a display panel including pixels;
a display driver configured to operate in a unit of a frame period including an active period and a blank period and to display an image on the display panel in the active period of the frame period, based on image data;
a touch array on the display panel and including touch electrodes;
a touch driver configured to transmit, in an uplink period, uplink signals including different information to an external device in proximity to the touch array through the touch electrodes, and to receive, from the external device, a sensing signal generated by the external device using at least some of the uplink signals; and
a touch controller configured to determine the uplink period based on the image data,
wherein the touch controller is configured to determine the uplink period with reference to grayscale levels of data pixels in the image data.

2. The display device according to claim 1, wherein the uplink period overlaps the active period.

3. The display device according to claim 2, wherein the uplink period further overlaps the blank period.

4. The display device according to claim 3, wherein the blank period is after the active period in the frame period.

5. The display device according to claim 3, wherein the blank period is before the active period in the frame period.

6. The display device according to claim 1,
wherein the touch controller is configured to compare the data pixels in the image data to be displayed on adjacent pixels among the pixels, and
wherein, based on a result of the comparison, the uplink period overlaps a time period in which the adjacent pixels emit light within the active period.

7. The display device according to claim 1,
wherein the touch controller is configured to compare the data pixels in the image data to be displayed on adjacent pixels among the pixels, and
wherein, based on a result of the comparison, the uplink period overlaps a time period other than a time period in which the adjacent pixels emit light within the active period.

8. The display device according to claim 1,
wherein a first image frame is received as the image data for a first frame period, and a second image frame is received as the image data for a second frame period subsequent to the first frame period,
wherein the touch controller is configured to compare data pixels in the first image frame to be displayed on some pixels among the pixels, and data pixels in the second image frame to be displayed on the some pixels, and
wherein, based on a result of the comparison, the uplink period overlaps a time period other than a time period in which the some pixels emit light within the active period of the second frame period.

9. The display device according to claim 1,
wherein the touch electrodes include first touch electrodes extending in a first direction, and second touch electrodes extending in a second direction, and
wherein the touch driver is configured to generate the uplink signals by encoding respective different information of the first touch electrodes and the second touch electrodes.

10. A display system comprising:
a display device comprising a display panel including pixels, and a touch array on the display panel and including touch electrodes, the display device being configured to operate in a unit of a frame period including an active period and a blank period and to display an image on the display panel in the active period of the frame period, based on image data; and
an external device configured to communicate with the display device through the touch array,
wherein the display device is configured to transmit, in an uplink period, uplink signals including different information to the external device in proximity to the touch array through the touch electrodes, to receives, from the external device, a sensing signal generated by the external device using at least some of the uplink signals, and to determine the uplink period based on the image data, and
wherein the external device is configured to generate the sensing signal using the uplink signals received through the touch electrodes in the uplink period,
wherein the display device is configured to determine the uplink period with reference to grayscale levels of data pixels in the image data.

11. The display system according to claim 10, wherein the external device is configured to calculate a noise component with reference to grayscale levels of data pixels in the image data.

12. The display system according to claim 11, wherein the external device is configured to offset the noise component from the sensing signal generated using the uplink signals.

13. The display system according to claim 10, wherein the uplink period overlaps the active period.

14. The display system according to claim 13, wherein the uplink period further overlaps the blank period.

15. The display system according to claim 10,
wherein the display device compares the data pixels in the image data to be displayed on adjacent pixels among the pixels, and wherein, based on a result of the comparison, the uplink period overlaps a time period in which the adjacent pixels emit light within the active period.

16. The display system according to claim 10, wherein the display device is configured to compare the data pixels in the image data to be displayed on adjacent pixels among the pixels, and wherein, based on a result of the comparison, the uplink period overlaps a time period other than a time period in which the adjacent pixels emit light within the active period.

17. The display system according to claim 10, wherein a first image frame is received as the image data for a first frame period, and a second image frame is received as the image data for a second frame period subsequent to the first frame period, wherein the display device is configured to compare data pixels in the first image frame to be displayed on some pixels among the pixels, and data pixels in the second image frame to be displayed on some pixels, and wherein, based on a result of the comparison, the uplink period overlaps a time period other than a time period in which the some pixels emit light within the active period of the second frame period.

18. A method of driving a display device configured to operate in a unit of a frame period including an active period and a blank period and display an image on a display panel in the active period of the frame period, based on image data, the display device comprising the display panel including pixels, and a touch array on the display panel and including touch electrodes, the method comprising:

determining an uplink period in which uplink signals including different information are transmitted through the touch electrodes based on the image data, wherein the uplink period is determined with reference to grayscale levels of data pixels in the image data;

transmitting the uplink signals to an external device in proximity to the touch array in the uplink period; and receiving, from the external device, a sensing signal generated by the external device using at least some of the uplink signals.

\* \* \* \* \*